(12) United States Patent
Nagai et al.

(10) Patent No.: US 9,315,683 B2
(45) Date of Patent: Apr. 19, 2016

(54) INK, INK CARTRIDGE, AND INK JET RECORDING METHOD

(71) Applicant: CANON KABUSHIKI KAISHA, Tokyo (JP)

(72) Inventors: Souichi Nagai, Kawasaki (JP); Masashi Ogasawara, Machida (JP); Keigo Gouda, Kawasaki (JP); Fumiaki Fujioka, Kawasaki (JP); Akiko Yasuda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 66 days.

(21) Appl. No.: 14/236,321

(22) PCT Filed: May 7, 2013

(86) PCT No.: PCT/JP2013/002934
§ 371 (c)(1),
(2) Date: Jan. 30, 2014

(87) PCT Pub. No.: WO2013/168408
PCT Pub. Date: Nov. 14, 2013

(65) Prior Publication Data
US 2014/0192111 A1    Jul. 10, 2014

(30) Foreign Application Priority Data

May 9, 2012  (JP) .................................. 2012-107452

(51) Int. Cl.
| C09D 11/00 | (2014.01) |
| C09D 11/322 | (2014.01) |
| C09D 11/32 | (2014.01) |
| B41J 2/21 | (2006.01) |
| C09D 11/38 | (2014.01) |

(52) U.S. Cl.
CPC ............. *C09D 11/322* (2013.01); *B41J 2/2107* (2013.01); *C09D 11/32* (2013.01); *C09D 11/38* (2013.01)

(58) Field of Classification Search
CPC .... B41J 2/17503; B41J 2/2107; C09D 11/32; C09D 11/322; C09D 11/324; C09D 11/38; C09D 11/40

USPC ................ 347/86, 100, 95–10; 523/160, 161; 106/31.13, 31.6
See application file for complete search history.

(56) References Cited

U.S. PATENT DOCUMENTS

| 7,550,039 | B2 | 6/2009 | Szajewski |
| 7,819,962 | B2 * | 10/2010 | Gu ................ 106/31.6 |
| 8,985,755 | B2 * | 3/2015 | Fujioka et al. ............... 347/100 |
| 2005/0012796 | A1 * | 1/2005 | Doi ................. C09D 11/30 347/100 |
| 2007/0100024 | A1 * | 5/2007 | Gu et al. .................... 523/160 |
| 2012/0026240 | A1 * | 2/2012 | Saito ................ 347/21 |
| 2012/0033012 | A1 | 2/2012 | Nagai |

FOREIGN PATENT DOCUMENTS

| CN | 101379143 A | 3/2009 |
| CN | 102344717 A | 2/2012 |
| JP | 2000-198955 A | 7/2000 |
| JP | 2005-350612 A | 12/2005 |
| JP | 2009-515007 A | 4/2009 |
| JP | 2012-052097 A | 3/2012 |
| WO | 2007/053564 A2 | 5/2007 |

* cited by examiner

*Primary Examiner* — Matthew Luu
*Assistant Examiner* — Rut Patel
(74) *Attorney, Agent, or Firm* — Canon U.S.A. Inc., IP Division

(57) ABSTRACT

The present invention provides an ink that can achieve image characteristics for recording an image having excellent optical density, bleeding resistance, and white blur resistance and also can achieve reliability that provides excellent sticking resistance to a recording head. The ink is one for ink jet containing a first pigment and second pigment. The first pigment is a self-dispersible pigment to a surface of a particle of which a first functional group containing a phosphonic acid group is bonded. The second pigment is a self-dispersible pigment to a surface of a particle of which a second functional group not containing a phosphonic acid group but containing an anionic group other than the phosphonic acid group, and further containing another atomic group is bonded. The introduced amount of the functional group of the second pigment is 0.25 mmol/g or more.

11 Claims, No Drawings

INK, INK CARTRIDGE, AND INK JET RECORDING METHOD

TECHNICAL FIELD

The present invention relates to an ink, an ink cartridge, and an ink jet recording method.

BACKGROUND ART

Recently, there are demands for further increasing the optical density and bleeding resistance of images recorded by ink jet recording. Recording media on which images are recorded, in particular, plain paper, have different degrees of ink permeability, and such difference affects the image characteristics. In particular, a recording medium having high ink permeability tends to reduce the optical density of a recorded image and also tends to reduce the bleeding resistance. In recent years, ink jet recording has become popular, and recorded images are required to simultaneously achieve the above-mentioned performances at high levels regardless of the type of the recording medium, i.e., even on recording media having high permeability.

As countermeasures against the above, there are proposals focusing on the functional group of self-dispersible pigment (see PTLs 1 to 3). PTL 1 describes an ink containing self-dispersible pigment to a particle of which a functional group showing high reactivity to calcium is bonded and self-dispersible pigment to a particle of which a functional group different from the above-mentioned group is bonded. Such an ink can record an image with a high optical density. PTL 2 describes an ink containing self-dispersible pigment to a particle of which an ionic group is directly bonded and self-dispersible pigment to a particle of which an ionic group is bonded via another atomic group. Such an ink can reduce the dependency of the optical density on the type of plain paper. PTL 3 describes an ink containing self-dispersible pigment to a particle of which two types of functional groups are bonded. Such an ink can suppress a reduction in the optical density of a recorded image.

CITATION LIST

Patent Literature

PTL 1: PCT Japanese Translation Patent Publication No. 2009-515007
PTL 2: U.S. Pat. No. 7,550,039
PTL 3: Japanese Patent Laid-Open No. 2005-350612

SUMMARY OF INVENTION

Technical Problem

Though various investigations for enhancing the optical density and the bleeding resistance of recorded images have been carried out, the results of investigations by the present inventors demonstrate that no existing technologies can satisfy the image characteristics that are required in recent years. That is, in the ink containing two types of self-dispersible pigments described in PTL 1, some type of the self-dispersible pigment causes whitish unevenness (hereinafter, referred to as "white blur") in an image at a portion contiguous to another ink on a recording medium of which calcium content is low. In addition, depending on the combination of selected self-dispersible pigments, the optical density of a recorded image is not highly increased. In the inks described in PTLs 2 and 3, the optical density, the bleeding resistance and the white blur resistance need to be further improved for recording an image on a recording medium having low ink permeability. Furthermore, in the ink described in PTL 2, the pigment tends to stick to the ejection orifice of a recording head, and reliability such as sticking resistance needs to be further improved.

The present invention provides an ink that can achieve image characteristics that allow recording of an image having excellent optical density, bleeding resistance, and white blur resistance and also can achieve reliability that provides excellent sticking resistance at the recording head. The present invention also provides an ink cartridge and an ink jet recording method using the ink.

Solution to Problem

The present invention provides an ink for ink jet containing a first pigment and a second pigment. The first pigment is a self-dispersible pigment to a surface of a particle of which a first functional group containing a phosphonic acid group is bonded. The second pigment is a self-dispersible pigment to a surface of a particle of which a second functional group not containing a phosphonic acid group but containing an anionic group other than the phosphonic acid group, and further containing another atomic group is bonded. The introduced amount of the functional group of the second pigment is 0.25 mmol/g or more.

Advantageous Effects of Invention

The present invention can provide an ink that can achieve image characteristics that allow recording of an image having excellent optical density, bleeding resistance, and white blur resistance and also can achieve reliability that provides excellent sticking resistance at the recording head. The present invention can also provide an ink cartridge and an ink jet recording method using the ink.

DESCRIPTION OF EMBODIMENTS

The present invention will now be described in detail by embodiments. Hereinafter, the ink for ink jet may be simply referred to as "ink"; the first pigment may be referred to as "phosphonic acid-type self-dispersible pigment"; and the self-dispersible pigment may be referred to as "pigment".

The results of investigations by the present inventors demonstrate that it is important to achieve both the following two requirements (1) and (2) for increasing the optical density of an image recorded by an ink containing a self-dispersible pigment. Specifically, (1) the presence of a certain amount of a pigment on the surface of a recording medium as quick as possible after application of the ink to the recording medium and (2) roughening of the surface of a pigment layer are important. The requirement (1) can increase the optical density by aggregating a certain amount of a pigment at an early stage to deposit the pigment on the recording medium surface and thereby inhibiting the permeation of a subsequently aggregating pigment into the recording medium. The requirement (2) can increase the optical density by that the roughened surface of a pigment layer increases the incorporation of incident light and decreases the reflected light.

In the case of using a phosphonic acid-type self-dispersible pigment (first pigment) as a coloring material of an ink, the pigment strongly reacts with calcium contained in a recording medium and thereby ununiformly aggregates to achieve the requirement (2) and easily increase the optical density. However, the results of further investigations by the present inventors demonstrate that the optical density is not sufficiently increased in some images recorded on recording media having high permeability even if an ink containing the first pigment is used. After application of an ink containing a pigment to a recording medium, solid-liquid separation occurs between the pigment and liquid components other than the pigment by evaporation and permeation into the recording medium of the liquid components such as water in the ink. The solid-liquid separation of the phosphonic acid-type self-dispersible pigment is slow compared to those of other self-dispersible pigments such as carboxylic acid-type and sulfonic acid-type self-dispersible pigments. Consequently, in the case of applying an ink containing a phosphonic acid-type self-dispersible pigment onto a recording medium having high permeability, a relatively large amount of the pigment sink into the recording medium together with the liquid components, without depositing on the recording medium surface. It is believed that as a result, the requirement (1) is not achieved and thereby the optical density decreases. In addition, in the case of applying the ink onto a recording medium of which calcium content is low, since the reaction with calcium contained in the recording medium hardly occurs, the solid-liquid separation further becomes slow. In this case, the ink containing the first pigment is pulled by another ink present contiguous to the ink, and the first pigment thereby sinks into the recording medium. As a result, color mixing (bleeding) of inks and a phenomenon of "white blur" recognized as whitish unevenness occur in the boundary portion between these inks.

The present inventors have found through investigations that the composition of the present invention allows recording of an image having excellent optical density, bleeding resistance, and white blur resistance and provides an ink showing excellent sticking resistance at the recording head, and the present invention has been accomplished. The ink of the present invention contains self-dispersible pigments as first pigment and second pigment. The first pigment is a self-dispersible pigment to a surface of a particle of which a first functional group is bonded, wherein the functional group contains a phosphonic acid group. The second pigment is a self-dispersible pigment to a surface of a particle of which a second functional group is bonded, wherein the functional group contains an anionic group other than a phosphonic acid group, and another atomic group; and the introduced amount of the functional group is 0.25 mmol/g or more. The use of two types of self-dispersible pigments allows formation of an image having a satisfactory optical density even on a recording medium having high permeability, compared to the case of using only one of the self-dispersible pigments alone. Furthermore, it is also possible to form an image with preventing occurrence of bleeding and white blur even on a recording medium of which calcium content is low.

The present inventors surmise that the effects described above are achieved as follows. The effect of providing an image having a higher optical density on a recording medium having high permeability by using two types of self-dispersible pigments compared to the case of using one of the self-dispersible pigments alone is surmised as follows. As described above, in order to increase the optical density, achievement of both the requirements (1) and (2) is effective. However, since the solid-liquid separation of the first pigment is slow, the achievement of the requirement (1) is difficult. Accordingly, the second pigment of which solid-liquid separation proceeds faster is used together with the first pigment. The solid-liquid separation of the second pigment proceeds faster than that of the first pigment, and the aggregated second pigment deposits on the surface of a recording medium. As a result, a function such as "filling" is caused, and subsequently solid-liquid separation occurs to inhibit the aggregated first pigment from sinking into the recording medium. Furthermore, it is believed that the first pigment that can achieve the requirement (2) is present on the surface side of the pigment layer and that thereby the optical density increases compared to the case of using the first pigment alone.

The inhibition of bleeding and white blur from occurring is surmised as follows. Bleeding is a phenomenon caused by mixing of an ink with another ink. White blur is a phenomenon of sinking of a pigment by being pulled by means of permeation of another ink. These problems are caused after application of an ink to a recording medium in such manner that bleeding occurs first and then white blur occurs. It is therefore believed that the reaction between a pigment and calcium, i.e., the phenomenon that instantly occurs, is dominant for inhibiting the bleeding; and the solid-liquid separation, i.e., the phenomenon that occurs at relatively late timing, is dominant for inhibiting the white blur. Since the solid-liquid separation of the first pigment is slow, an ink containing the first pigment alone tends to cause white blur. However, in an ink containing both the first pigment and the second pigment, since the solid-liquid separation of the second pigment is rapid, it is believed that the second pigment remains near the surface of the recording medium to exhibit a filler function and inhibits occurrence of white blur. The first pigment having a high reactivity to calcium rapidly aggregates, and also the second pigment, though the reactivity of which to calcium is relatively low, starts to rapidly aggregate due to the high introduced amount of the functional group of the second pigment. It is thought that as a result of above, occurrence of bleeding is prevented.

Requirements for obtaining a difference in speed of solid-liquid separation between the first pigment and the second pigment without decreasing the sticking resistance are conditions of the structures of the functional groups of the first pigment and the second pigment and the introduced amount of the functional group of the second pigment. The major anionic groups of self-dispersible pigments used in inks for ink jet are a carboxylic acid group, a sulfonic acid group and a phosphonic acid group (phosphoric acid group). The results of investigations by the present inventors demonstrate that self-dispersible pigment having the phosphonic acid group as the anionic group shows specifically slow solid-liquid separation, though self-dispersible pigments having the carboxylic acid group or the sulfonic acid group show rapid solid-liquid separation. In order to increase the difference in speed of solid-liquid separation depending on the type of the anionic group, the second pigment should be self-dispersible pigment to a particle of which a functional group (second functional group) containing an anionic group other than a phosphonic acid group, and another atomic groups is bonded. In self-dispersible pigment to a particle of which an anionic group is directly bonded, the difference in speed of solid-liquid separation is insufficient for exhibiting a filler function on the recording medium. In addition, in such a self-dispersible pigment, it is difficult to sufficiently increase the introduced amount of the functional group, resulting in a problem of easily decreasing the sticking resistance to the ejection orifice of a recording head.

Furthermore, an increase in the introduced amount of the functional group of the second self-dispersible pigment causes no bonding of the functional groups and decreases the exposed area of the surface of the pigment particle. In addition, since the second functional group contains another atomic group in addition to the anionic group, the second self-dispersible pigment has a sterically large structure. These conditions are combined with each other to prevent solvation of a water-soluble organic solvent to the surface of the particle of the second pigment. In an ink containing such a second pigment applied onto a recording medium, a reduction in the amount of the liquid components by evaporation of moisture condenses the electric double layer that keeps the stability of the dispersion state of the pigment, resulting in instability of the dispersion state to cause rapid aggregation of the pigment. In a pigment to which a water-soluble organic solvent hardly solvates, since the water-soluble organic solvent hardly stabilizes the dispersion of the pigment, the above-described aggregation of the pigment particularly efficiently proceeds to enhance the solid-liquid separation. Because of these reasons, even in the self-dispersible pigment to the surface of particle of which the second functional group is bonded, if the introduced amount of the functional group is less than 0.25 mmol/g, the difference in speed of the solid-liquid separation between the first pigment and the second pigment is insufficient, and the filler function by the second pigment is not exhibited. As a result, occurrence of white blur is not inhibited, and the optical density hardly increases.

Furthermore, even if two types of phosphonic acid-type self-dispersible pigments having different structures of the functional groups are contained in the ink, a difference in speed of the solid-liquid separation hardly occurs, and therefore a filler function on the recording medium is not exhibited. In the case of containing two types of self-dispersible pigments other than the phosphonic acid-type self-dispersible pigment, since the surface of the pigment layer is not roughened, unlike the case of containing the first pigment being a phosphonic acid-type self-dispersible pigment, the optical density does not increase. In an ink containing only a self-dispersible pigment having a functional group containing both a phosphonic acid group and another anionic group different from the phosphonic acid group, the solid-liquid separation is slow due to the phosphonic acid group. Consequently, the filler function by a difference in speed of the solid-liquid separation is not exhibited, and an effect comparable to that of the ink containing both the first pigment and the second pigment of the present invention cannot be obtained.

Ink

Each component of the ink of the present invention and physical properties of the ink will now be described in detail.

Pigment

Examples of the pigment include organic pigments and inorganic pigments such as carbon black, and any pigment that can be used in the ink for ink jet can be used. In addition, for example, dye may be simultaneously used for color toning. In particular, the present invention can be applied to black inks containing carbon black as a pigment.

The coloring materials contained in the ink of the present invention are two types of self-dispersible pigments: a first pigment composed of a pigment particle having a functional group containing a phosphonic acid group bonded to its surface, and a second pigment composed of a pigment particle having a functional group containing an anionic group other than the phosphonic acid group, and another atomic group bonded to its surface. The ink containing such self-dispersible pigments does not need to contain any dispersing agent for dispersing the pigments in the ink or needs only a slight amount of the dispersing agent.

The total content (% by mass) of the pigments in the ink is preferably 0.1% by mass or more and 15.0% by mass or less, and more preferably 1.0% by mass or more and 10.0% by mass or less, based on the total mass of the ink. The content (% by mass) of the first pigment in the ink is preferably 0.1% by mass or more and 10.0% by mass or less, and more preferably 0.5% by mass or more and 5.0% by mass or less, based on the total mass of the ink. The content (% by mass) of the second pigment in the ink is preferably 0.1% by mass or more and 10.0% by mass or less, and more preferably 0.5% by mass or more and 5.0% by mass or less, based on the total mass of the ink. In addition, the mass ratio of the content (% by mass) of the first pigment based on the total mass of the ink to the content (% by mass) of the second pigment based on the total mass of the ink is preferably 0.4 times or more and 4.0 times or less, and more preferably 0.5 times or more and 2.0 times or less. That is, "the content (% by mass) of the first pigment"/"the content (% by mass) of the second pigment" is preferably 0.4 times or more and 4.0 times or less, and more preferably 0.5 times or more and 2.0 times or less. If the mass ratio is less than 0.4 times, an image having a high optical density may not be recorded. In contrast, if the mass ratio is more than 3.0 times, an image having excellent white blur resistance may not be recorded; and if the mass ratio is more than 4.0 times, an image having excellent bleeding resistance and excellent white blur resistance may not be recorded.

The introduced amount of the functional group of the first pigment can be equal to or less than the introduced amount of the functional group of the second pigment. If the introduced amount of the functional group of the first pigment is more than the introduced amount of the functional group of the second pigment, an image having a high optical density and excellent white blur resistance may not be recorded.

First Pigment

The first pigment is self-dispersible pigment to a surface of a particle of which a first functional group containing a phosphonic acid group is bonded. In the ink, the phosphonic acid group, —PO(O[$M_1$])$_2$, may be in a partially dissociated state or in a completely dissociated state. That is, the phosphonic acid group can be any of the states of —PO$_3$H$_2$ (acid type), —PO$_3$H$^-$M$_1^+$ (monobasic base) and —PO$_3$$^{2-}$(M$_1^+$)$_2$ (dibasic salt). Herein, $M_1$ independently represents at least one selected from the group consisting of a hydrogen atom, an alkali metal, ammonium and an organic ammonium. Examples of the alkali metal represented by $M_1$ include lithium, sodium and potassium. Examples of the organic ammonium represented by $M_1$ include alkylamines having 1 to 3 carbon atoms such as methylamine and ethylamine; and alkanolamines having 1 to 4 carbon atoms such as monoethanolamine, diethanolamine and triethanolamine.

In the present invention, the first functional group can contain two phosphonic acid groups. Though an ink containing a monophosphonic acid-type self-dispersible pigment can increase the optical density of an image recorded thereby, an ink containing a bisphosphonic acid-type self-dispersible pigment as the first pigment can further increase the optical density. However, in an ink containing a trisphosphonic acid-type self-dispersible pigment, the storage stability of the ink may be insufficient. In the present invention, the anionic group contained in the first functional group can be a phosphonic acid group only for increasing the difference in speed of the solid-liquid separation between the first pigment and the second pigment.

Furthermore, the phosphonic acid group can be present at one end of the functional group, that is, another atomic group can be present between the surface of the pigment particle and phosphonic acid group. Examples of the atomic group (—R—) include linear or branched alkylene groups having 1 to 12 carbon atoms; arylene groups such as a phenylene group and a naphthylene group; an amido group; a sulfonyl group; an amino group; a carbonyl group; ester groups; and ether groups; and also combinations of these groups. In particular, the atomic groups can contain at least either an alkylene group or an arylene group and a group having hydrogen bond properties (such as an amido group, a sulfonyl group, an amino group, a carbonyl group, an ester group and an ether group). In the present invention, in particular, the functional group can contain —$C_6H_4$—CONH— (benzamide structure).

Furthermore, in the present invention, the functional group bonded to the surface of a pigment particle can contain a structure —$CQ(PO_3[M_1]_2)_2$. In the formula, Q represents a hydrogen atom, R, OR, SR or $NR_2$. R independently represents a hydrogen atom, an alkyl group, an acyl group, an aralkyl group, or an aryl group. When R represents a group containing a carbon atom or atoms, the number of the carbon atom(s) can be 1 to 18, and specific examples thereof include alkyl groups such as a methyl group and an ethyl group; acyl groups such as an acetyl group and a benzoyl group; aralkyl groups such as a benzyl group; and aryl groups such as a phenyl group and a naphthyl group. $M_1$ independently represents at least one selected from the group consisting of a hydrogen atom, an alkali metal, ammonium and an organic ammonium. In the present invention, in particular, a functional group containing a structure represented by the above-mentioned formula in which Q represents a hydrogen atom: —$CH(PO_3[M_1]_2)_2$, can be bonded to the pigment particle surface.

In the case in which a second self-dispersible pigment is not the phosphonic acid-type self-dispersible pigment, as described above, the optical density can be easily increased by increasing the introduced amount of the functional group. Furthermore, the results of investigations by the present inventors demonstrate that though the sticking resistance of an ink to the recording head is not decreased by increasing the introduced amount of the functional group of the second pigment, the sticking resistance of an ink to the recording head may slightly decrease if the introduced amount of the functional group of the first pigment is too high. In the case of an ink containing the phosphonic acid-type self-dispersible pigment as a coloring material, the sticking resistance of the ink is readily affected by the pH of the ink, the water-soluble organic solvent and the salt. This is because that the phosphonic acid group contained in the first functional group has a plurality of pKa values and that these pKa values are within a common range of pH of inks. That is, if the introduced amount of the functional group is too high, the phosphonic acid-type self-dispersible pigment becomes sensitive, in particular, to a change in pH of the ink, and it is believed that the sticking resistance of the ink slightly decreases in some cases. In contrast, if the introduced amount of the functional group of the first pigment is too low, the amount of the phosphonic acid groups for dispersing the pigment is small, resulting in a slight decrease in the storage stability of the ink in some cases.

Accordingly, the introduced amount of the functional group of the first pigment is preferably 0.10 mmol/g or more and 0.33 mmol/g or less, and more preferably 0.25 mmol/g or more and 0.31 mmol/g or less. An introduced amount of the functional group of less than 0.10 mmol/g may not provide an ink having sufficient storage stability. In contrast, an introduced amount of the functional group of more than 0.33 mmol/g may not provide an ink having sufficient sticking resistance. The units of the introduced amount of the functional group of the first pigment and the second pigment are each the number of millimoles of the functional groups per 1 g of the pigment solid content.

The amount of the first functional group bonded to the first pigment can be quantitatively determined by measuring phosphorus as shown below. Specifically, a liquid A is prepared by diluting a pigment dispersion with pure water such that the content of the pigment (solid content) is about 0.03% by mass. Separately, a liquid B is prepared by ultracentrifuging the pigment dispersion at 5 degrees Celsius at 80,000 rpm for 15 hours to remove the pigment and diluting the collected supernatant with pure water by about 80 times. The phosphorus concentrations in the resulting liquid A and liquid B are measured with, for example, an ICP emission spectrophotometer, and the amount of phosphonic acid groups can be calculated from the difference in the amount of phosphorus between the liquid A and the liquid B. The introduced amount of the first functional group to the pigment can be calculated by dividing the amount of the phosphonic acid group by the number of the phosphonic acid group contained in one functional group, i.e., one in a mono-type, two in a bis-type and three in a tris-type. If the number of the phosphonic acid group contained in the first functional group is unclear, the structure can be specified by analyzing the structure by such as NMR. In a pH range of 7 to 9, the dissociation exponent of the phosphonic acid group is 1. In the method described above, the measurement is performed using a pigment dispersion, but the measurement can be similarly performed using an ink. The method of measuring the introduced amount of the first functional group is not limited to the method described above.

Second Pigment

The second pigment is self-dispersible pigment to a surface of a particle of which a second functional group is bonded, wherein the second function group does not contain a phosphonic acid group but contain an anionic group other than the phosphonic acid group, and further contain another atomic group. The introduced amount of the functional group is 0.25 mmol/g or more. The second pigment differs from the first pigment in that the anionic group is other than the phosphonic acid group, such as a carboxylic acid group and a sulfonic acid group. As described above, if the second functional group contains the phosphonic acid group, the speed of solid-liquid separation is decreased by influence of the phosphonic acid group. Accordingly, the second functional group is required not to contain the phosphonic acid group. The anionic group contained in the second functional group can be at least either the carboxylic acid group or the sulfonic acid group.

The second pigment differs from the first pigment also in that not only the anionic group but also another atomic group is necessary as the functional group bonded to the surface of the particle. The anionic group, which is not the phosphonic acid group, is required to be bonded to the surface of the pigment particle via another atomic group. As described above, if the anionic group is directly bonded to the surface of the pigment particle, the difference in speed of the solid-liquid separation between the first and the second self-dispersible pigments is insufficient, and it also makes the sticking resistance insufficient. Therefore, such a functional group is not suitable in the present invention.

The introduced amount of the functional group of the second pigment can be increased to some extent for increasing the difference in speed of solid-liquid separation. Specifically, the lower limit of the introduced amount of the functional group of the second pigment is preferably 0.40 mmol/g or more, and more preferably 0.44 mmol/g or more. The upper limit of the introduced amount of the functional group of the second pigment is preferably 1.00 mmol/g or less, and more preferably 0.80 mmol/g or less.

Examples of the anionic group, which is not the phosphonic acid group, contained in the second functional group include —$COOM_1$ and —$SO_3M_1$, wherein $M_1$ represents at least one selected from the group consisting of a hydrogen atom, an alkali metal, ammonium and an organic ammonium. Examples of the atomic group (—R—) include linear or branched alkylene groups having 1 to 12 carbon atoms; arylene groups such as a phenylene group and a naphthylene group; an amido group; a sulfonyl group; an amino group; a carbonyl group; ester groups; and ether groups; and also combinations of these groups. Examples of the alkali metal represented by $M_1$ include lithium, sodium and potassium. Examples of the organic ammonium represented by $M_1$ include alkylamines having 1 to 3 carbon atoms such as methylamine and ethylamine; and alkanolamines having 1 to 4 carbon atoms such as monoethanolamine, diethanolamine and triethanolamine. When the anionic group is in a salt form, the salt may be in a partially dissociated state or in a completely dissociated state.

In particular, the second pigment can be self-dispersible pigment to a surface of a particle —$R_1$—$(COOM_1)_n$ groups is bonded. The difference in speed of the solid-liquid separation tends to particularly increase with an increase in the introduced amount of —$R_1$—$(COOM_1)_n$ groups, and the effect of the present invention can be notably obtained. In the formula, $R_1$ represents an alkylene group or an arylene group; $M_1$ represents a hydrogen atom, an alkali metal, ammonium, or an organic ammonium; and n represents an integer of 1 or more. Specific examples of $R_1$ and $M_1$ are respectively the same as those exemplified as R and $M_1$ above. Furthermore, n can be an integer of 2 or more and 5 or less and can be 3 or less, in particular, n can be 2. The second pigment can be a self-dispersible pigment prepared by, for example, reacting a compound (treatment agent) having an anionic group with a pigment by diazo coupling.

The second pigment may be a resin-bonded self-dispersible pigment. In this resin-bonded self-dispersible pigment, the functional group bonded to the surface of the pigment particle can have a structure of a copolymer of an ionic monomer and a hydrophobic monomer. In such a pigment, the hydrophilicity of the pigment can be controlled by appropriately changing the copolymerization ratio of the ionic monomer and the hydrophobic monomer contained in the functional group. Furthermore, various characteristics can be imparted to the surfaces of the pigment particles by selecting the ionic monomer and the hydrophobic monomer and the combination of these monomers.

The amount of the second functional group bonded to the second pigment can be measured as follows. Specifically, the amount of the anionic groups can be calculated from the cation concentration in a pigment dispersion measured with an ion meter for example. The introduced amount of the second functional group to the pigment can be calculated by dividing the amount of the anionic groups by the number of the anionic groups contained in one functional group, i.e., one in a mono-type, two in a bis-type and three in a tris-type. If the number of the anionic group contained in the second functional group is unclear, the structure can be specified by analyzing the structure by such as NMR. In the method described above, the measurement is performed using a pigment dispersion, but the measurement can be similarly performed using an ink. The method of measuring the introduced amount of the second functional group is not limited to the method described above.

When the anionic group contained in the second functional group is a sulfonic acid group, the introduced amount of the second functional group can be quantitatively determined by measuring sulfur with an ICP emission spectrophotometer for example. The quantitative measurement of sulfur with an ICP emission spectrophotometer can be performed as in the method for determining the introduced amount of the first functional group to the pigment described above.

In an ink containing the first pigment and the second pigment, the introduced amount of the functional group bonded to each pigment can be determined by combining the methods described above. For example, the pigments (may be mixture of the first pigment and the second pigment) are separated from the ink by an appropriate method and are dispersed in water to prepare a pigment dispersion. The structures of the respective functional groups bonded to each pigment are specified through analysis by, for example, NMR. The cation concentration in this pigment dispersion is measured with an ion meter, and the total introduced amount of the anionic groups is calculated from the resulting cation concentration. The amount of phosphorus or sulfur is measured with an ICP emission spectrophotometer. The introduced amount of the functional group containing the phosphonic acid group or the sulfonic acid group is calculated, and the introduced amount of the carboxylic acid group is calculated from the difference between the introduced amount and the value measured by an ion meter. The method of measuring the introduced amounts of the functional groups bonded to both of the pigments are not limited to the method described above.

Briefly, a pigment can be separated by dropwise adding an aqueous solution containing cations of which solubility in a salt form in water highly varies depending on the type of the anionic group to an ink to selectively precipitate a specific pigment, and analysis of the structure of the pigment and measurement of the introduced amount of the functional group of the pigment can be performed. Since the phosphonic acid group contained in the first functional group has high reactivity with calcium ions compared to the anionic groups (carboxylic acid and sulfonic acid group) contained in the second functional group, such a method can be employed. The method can separate the first pigment (pigment having the phosphonic acid group) and the second pigment from each other when the second pigment has both the carboxylic acid group and the sulfonic acid group, and the method is therefore useful.

Salt Constituted by Combining Cation and Anion

The ink of the present invention can further contain a salt from the viewpoints of further increasing the optical density and further enhancing bleeding resistance and white blur resistance. The value obtained by multiplying the concentration of the anion of the salt in the ink by the valence number of the anion is preferably 0.005 mol/L or more and 0.06 mol/L or less. The present inventors have focused on the value obtained by multiplying the concentration of the anion of the salt by the valence number by the following reasons.

The self-dispersible pigment to a surface of a particle of which an anionic group is bonded directly or via another atomic group generally include a counter ion (cation). The counter ion may be the same cation from a salt that can be added to the ink. In a phosphonic acid-type self-dispersible pigment, the concentration of the counter ion of the anionic group bonded to the surface of the particle of the self-dispersible pigment directly or via another atomic group can vary depending on the pH of the ink. Accordingly, it is possible to more accurately grasp the relationships of the anionic group with the image characteristics or the reliability of the ink by focusing on the value obtained by multiplying the concentration of the anion of the salt by the valence number of the anion. The value obtained by multiplying the concentration of the anion of the salt by the valence number of the anion corresponds to the normality. In the present invention, the value obtained by multiplying the concentration of the anion of the salt in the ink by the valence number of the anion is preferably 0.005 mol/L or more and 0.06 mol/L or less, and more preferably 0.01 mol/L or more and 0.03 mol/L or less. A value of lower than 0.005 mol/L may not provide an image having a high optical density and excellent white blur resistance, and a value of lower than 0.01 mol/L may not provide an image having a high optical density. A value of more than 0.06 mol/L may slightly decrease the sticking resistance at the recording head. When the ink contains a plurality types of salts, the sum of each value obtained by multiplying the concentration of the anion of each salt by the valence number of each anion is used as the value of the concentration of the anion of the salts multiplied by the valence numbers of the anion.

Though it varies depending on the molecular weight of a salt, the content (% by mass) of the salt in an ink is preferably 0.05% by mass or more and 2.0% by mass or less based on the total mass of the ink. A content of less than 0.05% by mass may not provide an image having a high optical density on a recording medium having high permeability. A content of more than 2.0% by mass may not provide an ink having sufficiently high storage stability.

The above-mentioned salt is constituted by combining a cation and an anion. The cation is at least one selected from the group consisting of an alkali metal ion, ammonium ion and an organic ammonium ion. The anion is at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$. The salt in an ink may be in a partially dissociated state or in a completely dissociated state. The use of such a salt can particularly achieve both high reliability and improved image characteristics of the ink.

Examples of the salt constituted by combining a cation and an anion include $(M_2)Cl$, $(M_2)Br$, $(M_2)I$, $(M_2)ClO$, $(M_2)ClO_2$, $(M_2)ClO_3$, $(M_2)ClO_4$, $(M_2)NO_2$, $(M_2)NO_3$, $(M_2)_2SO_4$, $(M_2)_2CO_3$, $(M_2)HCO_3$, $HCOO(M_2)$, $(COO(M_2))_2$, $COOH(COO(M_2))$, $CH_3COO(M_2)$, $C_2H_4(COO(M_2))_2$, $C_6H_5COO(M_2)$, $C_6H_4(COO(M_2))_2$, $(M_2)_3PO_4$, $(M_2)_2HPO_4$ and $(M_2)H_2PO_4$, wherein $M_2$ represents at least one selected from the group consisting of an alkali metal ion, ammonium ions and an organic ammonium ion. Examples of the alkali metal ion include lithium ion, sodium ion and potassium ion. Examples of the organic ammonium include alkylamines having 1 to 3 carbon atoms such as methylamine and ethylamine; and alkanolamines having 1 to 4 carbon atoms such as monoethanolamine, diethanolamine and triethanolamine.

From the viewpoint of solubility, a salt of divalent anion can be used. For example, the salt can be at least one selected from the group consisting of $C_6H_4(COO(Na))_2$, $C_6H_4(COO(K))_2$, $C_6H_4(COO(NH_4))_2$ and $(NH_4)_2SO_4$, in particular, at least one selected from the group consisting of $C_6H_4(COO(K))_2$, $C_6H_4(COO(NH_4))_2$ and $(NH_4)_2SO_4$. The improvement in image characteristics by the salt is caused by that an increase in the electrolyte concentration of an ink allows the electric double layer of a self-dispersible pigment to be easily compressed to enhance aggregation of the pigment. Accordingly, the improvement in image characteristics is dominantly affected by the electrolyte concentration of an ink, i.e., the number of moles of the salt rather than the type of the ions constituting the salt.

Aqueous Medium

The ink of the present invention can contain an aqueous medium, which is a mixed medium of water and a water-soluble organic solvent. The water can be deionized water. The content (% by mass) of the water in the ink is preferably 40.0% by mass or more and 95.0% by mass or less based on the total mass of the ink. The content (% by mass) of the water-soluble organic solvent in the ink is preferably 3.0% by mass or more and 50.0% by mass or less based on the total mass of the ink. In order to further improve the sticking resistance at the recording head, the content (% by mass) of the water-soluble organic solvent in the ink is preferably 20.0% by mass or more based on the total mass of the ink. Any water-soluble organic solvent that can be used in inks for ink jet, such as alcohols, glycols, glycol ethers and nitrogen-containing compounds, can be used. These solvents may be used alone or in combination. The water-soluble organic solvent can be one having a vapor pressure lower than that of water at 25 degrees Celsius. In particular, for example, polyols such as glycerin and trimethylol propane, glycols such as triethylene glycol and nitrogen-containing compounds such as 2-pyrrolidone can be used. Water-soluble organic compounds that are solids at ordinary temperature, such as urea, its derivatives, trimethylol propane and trimethylol ethane, can also be used. Solutions prepared by dissolving these compounds in water can be used as solvents for dispersing pigments and can be handled as water-soluble organic solvents.

Other Additives

The ink of the present invention may further contain various auxiliaries, in addition to the components described above, such as a surfactant, a resin, a pH adjuster, an antifoam agent, a corrosion inhibitor, an antiseptic agent, an antifungal agent, an antioxidant, a reduction inhibitor and a chelating agent, according to need.

Examples of the surfactant include nonionic surfactants such as acetylene glycol-based, fluorine-based, silicone-based and polyoxyethylene alkyl ether-based nonionic surfactants. In particular, the nonionic surfactant can be an acetylene glycol-based surfactant, such as an acetylene glycol-ethylene oxide adduct and a polyoxyethylene alkyl ether-based nonionic surfactant. In particular, an acetylene glycol-ethylene oxide adduct can be used for providing excellent bleeding resistance. The content (% by mass) of the surfactant in an ink is preferably 0.05% by mass or more and 2.0% by mass or less, and more preferably 0.05% by mass or more and 1.0% by mass or less, based on the total mass of the ink.

Physical Properties

The ink of the present invention can have a static surface tension of 28 mN/m or more and 45 mN/m or less at 25 degrees Celsius. The ink can have a dynamic surface tension of 40 mN/m or more, and more preferably 45 mN/m or more, at 25 degrees Celsius when measured at a life time of 50 ms by a maximum bubble pressure method. The ink can have a viscosity of 1.0 mPa·s or more and 5.0 mPa·s or less, and more preferably 1.0 mPa·s or more and 3.0 mPa·s or less, at 25 degrees Celsius and can have a pH of 5 or more and 9 or less at 25 degrees Celsius.

Ink Cartridge

The ink cartridge of the present invention includes an ink and an ink storage portion for storing the ink. The ink stored in the ink storage portion is the ink of the present invention described above. In an example of the structure of the ink cartridge, the ink storage portion is composed of a negative pressure-generating member-containing chamber for containing a negative pressure-generating member that retains an ink impregnated therein by a negative pressure and an ink storage chamber for storing an ink without using the negative pressure-generating member. The ink cartridge may have a structure in which a negative pressure-generating member retains the whole quantity of an ink without having the ink storage chamber or a structure in which an ink storage chamber stores the whole quantity of an ink in a state not being impregnated in a negative pressure-generating member without having the negative pressure-generating member. Furthermore, the ink cartridge may be configured so as to have an ink storage portion and a recording head.

Ink Jet Recording Method

The ink jet recording method of the present invention is a method of recording an image on a recording medium by ejecting the above-described ink of the present invention from a recording head of an ink jet system. Examples of the system for ejecting an ink include a system in which mechanical energy is applied to an ink and a system in which thermal energy is applied to an ink. In the present invention, ink jet recording using thermal energy can be particularly employed. The ink jet recording can be performed by known steps except that the ink of the present invention is used.

EXAMPLES

The present invention will now be specifically described by examples, reference examples, and comparative examples. However, within the gist of the invention, the scope of the invention is not limited to the following examples. Throughout the specification, "part(s)" and "%" for the amount of each component are on a mass basis unless otherwise noted.

Preparation of Pigment Dispersion

Introduced Amount of Functional Group of First Pigment

A method for measuring the introduced amount of the functional group of a first pigment will be described. Liquid A was prepared by diluting a pigment dispersion with pure water such that the content of the pigment as the subject to be measured was about 0.03%. Separately, liquid B was prepared by ultracentrifuging a pigment dispersion at 5 degrees Celsius at 80,000 rpm for 15 hours to remove the pigment and diluting the collected supernatant with pure water by about 80 times. The phosphorus concentrations in the resulting liquid A and liquid B were measured with an ICP emission spectrophotometer (trade name "SPS5100", manufactured by SII Nano Technology Inc.). The amount of the phosphonic acid groups was calculated from the difference of the phosphorus amounts in the liquid A and the liquid B. The introduced amount of the first functional group to the surface of the pigment particle was calculated by dividing the amount of the phosphonic acid groups by the number of the phosphonic acid group contained in one functional group.

Pigment Dispersion 1

Carbon black (20 g: solid content), monosodium salt of ((4-aminobenzoylamino)-methane-1,1-diyl)bisphosphonic acid (7 mmol, treatment agent), nitric acid (20 mmol) and pure water (200 mL) were mixed. On this occasion, the carbon black used had a specific surface area of 220 $m^2/g$ and a DBP oil absorption of 105 mL/100 g, and mixing was performed with a Silverson mixer at room temperature at 6,000 rpm. After 30 minutes, a solution prepared by dissolving 20 mmol of sodium nitrite in a small amount of water was gradually added to the resulting mixture. By this mixing, the temperature of the mixture reached 60 degrees Celsius, and the reaction was performed at this state for 1 hour. Subsequently, the pH of the mixture was adjusted to 10 with an aqueous sodium hydroxide solution. After 30 minutes, 20 mL of pure water was added to the mixture, and the resulting mixture was subjected to diafiltration using a spectrum membrane. Subsequently, sodium ions were substituted by ammonium ions through ion exchange to obtain a dispersion having a content of the pigment of 10.0%. Thus, pigment dispersion 1 in which self-dispersible pigment to the surface of a particle of which ((4-aminobenzoylamino)-methane-1,1-diyl)bisphosphonic acid groups were bonded was dispersed in water was prepared, wherein the counter ion was ammonium. The introduced amount of the functional group was 0.26 mmol/g.

Pigment Dispersion 2

Pigment dispersion 2 was prepared as in pigment dispersion 1 except that sodium ions were substituted by potassium ions by ion exchange. ((4-Aminobenzoylamino)-methane-1, 1-diyl)bisphosphonic acid groups of which counter ion was potassium were bonded to the surface of the pigment particle in the resulting pigment dispersion 2. The introduced amount of the functional group was 0.26 mmol/g.

Pigment Dispersion 3

A dispersion was prepared as in pigment dispersion 1 except that 6 mmol of 4-aminobenzylphosphonic acid was used as the treatment agent. On this occasion, the 4-aminobenzylphosphonic acid used was one manufactured by Sigma-Aldrich Corporation. Furthermore, sodium ions were substituted by potassium ions by ion exchange to prepare pigment dispersion 3 in which self-dispersible pigment to the surface of a particle of which benzenebisphosphonic acid groups were bonded was dispersed in water was prepared, wherein the counter ion was potassium. The introduced amount of the functional group was 0.28 mmol/g.

Pigment Dispersion 4

Pigment dispersion 4 having a content of a pigment of 10.0% was prepared by the same process as in pigment dispersion 12 described below using the self-dispersible pigment (having a functional group containing a bisphosphonic acid group) in the pigment dispersion 6 described below in place of carbon black used in the pigment dispersion 12. Thus, pigment dispersion 4 in which self-dispersible pigment to the surface of a particle of which ((4-aminobenzoylamino)-methane-1,1-diyl)bisphosphonic acid groups and benzoic acid groups were bonded was dispersed in water was prepared, wherein the counter ion was ammonium. The introduced amount of the functional group containing the bisphosphonic acid groups was 0.10 mmol/g, and the introduced amount of the functional group containing the benzoic acid groups was 0.49 mmol/g. The introduced amount of the functional group containing the benzoic acid group was determined by subtracting the introduced amount of the functional group of the bisphosphonic acid-type self-dispersible pigment in the pigment dispersion 6 from the introduced amount of the functional group as the total amount of the bisphosphonic acid group and the benzoic acid group determined by conversion from the ammonium ion concentration in the pigment dispersion 12.

Pigment Dispersion 5

Pigment dispersion 5 was prepared as in pigment dispersion 1 except that the amount of the treatment agent was 0.8 mmol instead of 7 mmol. The introduced amount of the functional group was 0.08 mmol/g.

Pigment Dispersion 6

Pigment dispersion 6 was prepared as in pigment dispersion 1 except that the amount of the treatment agent was 1 mmol instead of 7 mmol. The introduced amount of the functional group was 0.10 mmol/g.

Pigment Dispersion 7

Pigment dispersion 7 was prepared as in pigment dispersion 1 except that the amount of the treatment agent was 9 mmol instead of 7 mmol. The introduced amount of the functional group was 0.33 mmol/g.

Pigment Dispersion 8

Pigment dispersion 8 was prepared as in pigment dispersion 1 except that the amount of the treatment agent was 10 mmol instead of 7 mmol. The introduced amount of the functional group was 0.35 mmol/g.

Pigment Dispersion 9

Sodium (4-(4-aminobenzenesulfonylamino)-1-hydroxybutane-1,1-diyl)bisphosphonate was synthesized using sodium alendronate. On this occasion, as the sodium alendronate, monosodium salt of (4-amino-1-hydroxybutane-1,1-diyl)bisphosphonic acid (manufactured by Zentiva) was used. An alendronate (34 g: 104 mmol) was added to 150 mL of pure water in a 500-mL beaker and was dissolved by adjusting the pH to 11 with an aqueous concentrated sodium hydroxide solution. To this solution was dropwise added nitrophenyl sulfonyl chloride (25 g: 110 mmol) dissolved in 100 mL of tetrahydrofuran. On this occasion, an aqueous sodium hydroxide solution was further added thereto to maintain the pH of the solution to 10 to 11. After completion of adding, this solution was stirred at room temperature for 2 hours. Subsequently, tetrahydrofuran was evaporated in vacuum, and the solution was adjusted to a pH of 4 to precipitate a solid, followed by cooling at 4 degrees Celsius overnight. Subsequently, the solid was collected by filtration and was washed with pure water and then dried to yield sodium (4-(4-aminobenzenesulfonylamino)-1-hydroxybutane-1,1-diyl)bisphosphonate.

Carbon black (20 g: solid content), the resulting sodium (4-(4-aminobenzenesulfonylamino)-1-hydroxybutane-1,1-diyl)bisphosphonate (7 mmol, treatment agent), nitric acid (20 mmol) and pure water (200 mL) were mixed. On this occasion, the carbon black used had a specific surface area of 220 $m^2/g$ and a DBP oil absorption of 105 mL/100 g, and mixing was performed with a Silverson mixer at room temperature at 6,000 rpm. After 30 minutes, a solution prepared by dissolving 20 mmol of sodium nitrite in a small amount of water was gradually added to the resulting mixture. By this mixing, the temperature of the mixture reached 60 degrees Celsius, and the reaction was performed at this state for 1 hour. Subsequently, the pH of the mixture was adjusted to 10 with an aqueous sodium hydroxide solution. After 30 minutes, 20 mL of pure water was added to the mixture, and the resulting mixture was subjected to diafiltration using a spectrum membrane. Subsequently, sodium ions were substituted by ammonium ions through ion exchange to obtain a dispersion having a content of the pigment of 10.0%. Thus, pigment dispersion 9 in which self-dispersible pigment to the surface of a particle of which (4-(4-aminobenzenesulfonylamino)-1-hydroxybutane-1,1-diyl)bisphosphonic acid groups were bonded was dispersed in water was prepared, wherein the counter ion was ammonium. The introduced amount of the functional group was 0.27 mmol/g.

Pigment Dispersion 10

4-Aminophthalic acid (1.5 g, treatment agent) was added to a solution of concentrated hydrochloric acid (5 g) dissolved in water (5.5 g) with cooling at 5 degrees Celsius. Subsequently, this solution was stirred with maintaining the temperature of the solution at 10 degrees Celsius or less by placing the container containing the solution in an ice bath, and a solution of potassium nitrite (2.2 g) dissolved in water (9 g) at 5 degrees Celsius was added to the solution. The resulting solution was further stirred for 15 minutes, and then carbon black (solid content: 6 g, specific surface area: 220 $m^2/g$, DBP oil absorption: 105 mL/100 g) was added thereto under stirring, followed by further stirring for 15 minutes. The resulting slurry was filtered with a paper filter (trade name "Paper Filter for Standard Use No. 2", manufactured by Advantec Co., Ltd.), and the collected particles were sufficiently cooled with water and were dried in an oven at 110 degrees Celsius. Subsequently, potassium ions were substituted by ammonium ions through ion exchange to obtain a dispersion having a content of the pigment of 10.0%. Thus, pigment dispersion 10 in which self-dispersible pigment to the surface of a particle of which phthalic acid groups were bonded was dispersed in water was prepared, wherein the counter ion was ammonium. The ammonium concentration in the pigment dispersion 10 was measured with an ion meter (manufactured by DKK-Toa Corporation), and the introduced amount of the functional group determined by conversion from the ammonium ion concentration was 0.68 mmol/g.

Pigment Dispersion 11

Pigment dispersion 11 was prepared as in pigment dispersion 10 except that substitution of potassium ions by ammonium ions by ion exchange was not performed. The introduced amount of the functional group was 0.68 mmol/g.

Pigment Dispersion 12

Para-Aminobenzoic acid (1.55 g, treatment agent) was added to a solution of concentrated hydrochloric acid (5 g) dissolved in water (5.5 g) with cooling at 5 degrees Celsius. Subsequently, this solution was stirred with maintaining the temperature of the solution at 10 degrees Celsius or less by placing the container containing the solution in an ice bath, and a solution of potassium nitrite (2.2 g) dissolved in water (9 g) at 5 degrees Celsius was added to the solution. The resulting solution was further stirred for 15 minutes, and then carbon black (solid content: 6 g, specific surface area: 220 $m^2/g$, DBP oil absorption: 105 mL/100 g) was added thereto under stirring, followed by further stirring for 15 minutes. The resulting slurry was filtered with a paper filter (trade name "Paper Filter for Standard Use No. 2", manufactured by Advantec Co., Ltd.), and the collected particles were sufficiently cooled with water and were dried in an oven at 110 degrees Celsius. Subsequently, potassium ions were substituted by ammonium ions through ion exchange to obtain a dispersion having a content of the pigment of 10.0%. Thus, pigment dispersion 12 in which self-dispersible pigment to the surface of a particle of which benzoic acid groups were bonded was dispersed in water was prepared, wherein the counter ion was ammonium. The introduced amount of the functional group was 0.57 mmol/g.

Pigment Dispersion 13

Para-Aminobenzenesulfonic acid (1.55 g) was added to a solution of concentrated hydrochloric acid (5 g) dissolved in water (5.5 g) with cooling at 5 degrees Celsius. Subsequently, this solution was stirred with maintaining the temperature of the solution at 10 degrees Celsius or less by placing the container containing the solution in an ice bath, and a solution of potassium nitrite (2.2 g) dissolved in water (9 g) at 5 degrees Celsius was added to the solution. The resulting solution was further stirred for 15 minutes, and then carbon black (solid content: 6 g, specific surface area: 220 $m^2/g$, DBP oil absorption: 105 mL/100 g) was added thereto under stirring, followed by further stirring for 15 minutes. The resulting slurry was filtered with a paper filter (trade name "Paper Filter for Standard Use No. 2", manufactured by Advantec Co., Ltd.), and the collected particles were sufficiently cooled with water and were dried in an oven at 110 degrees Celsius. Subsequently, potassium ions were substituted by ammonium ions through ion exchange to obtain a dispersion having a content of the pigment of 10.0%. Thus, pigment dispersion 13 in which self-dispersible pigment to the surface of a particle of which benzenesulfonic acid groups was bonded was dispersed in water was prepared, wherein the counter ion was ammonium. The introduced amount of the functional group was 0.57 mmol/g.

Pigment Dispersion 14

Pigment dispersion 14 was prepared as in pigment dispersion 10 except that the amount of the treatment agent was 0.6 g. The introduced amount of the functional group was 0.26 mmol/g.

Pigment Dispersion 15

Pigment dispersion 15 was prepared as in pigment dispersion 10 except that the amount of the treatment agent was 0.5 g. The introduced amount of the functional group was 0.23 mmol/g.

Pigment Dispersion 16

Pigment dispersion 16 was prepared as in pigment dispersion 12 except that the amount of the treatment agent was 0.62 g. The introduced amount of the functional group was 0.23 mmol/g.

Pigment Dispersion 17

Carbon black having a specific surface area of 220 $m^2/g$ and a DBP oil absorption of 105 mL/100 g was oxidized. The oxidation was performed by adding carbon black (100 g) to a 1.0 mol/L of aqueous sodium peroxodisulfate (3 L) and stirring the mixture at a stirring rate of 0.12 $s^{-1}$ at 60 degrees Celsius for 10 hours. Subsequently, the pigment was collected by filtration, and the hydrophilic groups on the surface of the pigment particles were neutralized with a 1.0 mol/L of aqueous potassium hydroxide solution, followed by centrifugation. Furthermore, the salt remaining in the supernatant was removed with ultrafiltration membrane (trade name "AHP-1010", manufactured by Asahi Kasei Corporation) having a cut-off molecular weight of 50,000, and then the content of the pigment was adjusted to 10.0% to obtain a dispersion. Thus, pigment dispersion 17 in which surface-oxidized self-dispersible pigment was dispersed in water was prepared. The pigment dispersion 17 had an electric conductivity of 1.3 mS/cm and a pH of 6.0. Carboxylic acid group was contained in the functional group of the self-dispersible pigment in the pigment dispersion 17, but no any other atomic group was contained.

Preparation of Ink

Each ink was prepared by subjecting the components (unit: %) shown in the upper rows of Table 1 to mixing, sufficient stirring, and then pressure filtration through a polypropylene filter (manufactured by Pall Corporation) having a pore size of 2.5 micrometers. In Table 1, Surfynol 465 is an acetylene glycol ethylene oxide adduct manufactured by Air Products and Chemicals, Inc. and is a surfactant in which the number of moles of the added ethylene oxide groups is ten. NIKKOL BL-9EX is a polyoxyethylene lauryl ether manufactured by Nikko Chemicals Co., Ltd. and is a surfactant in which the HLB value measured by a Griffin method is 14.5 and the number of moles of the added ethylene oxide groups is nine. In the lower rows of Table 1, characteristics of each ink are shown. "Concentration of anion of salt*valence number of anion [mol/L]" was calculated by dividing the content of the salt by the value of molecular weight*valence number*10.

TABLE 1

Composition and characteristics of ink

| | Example | | | | | | | | | | | | | | | | | | | | | | | | |
|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Pigment dispersion 1 | 18.00 | | | 6.00 | 9.00 | | | | | | | | | | | | | | | | | | | | |
| Pigment dispersion 2 | | 18.00 | | | | | | | | | | | | | | | | | | | | | 18.00 | 18.00 | |
| Pigment dispersion 3 | | | 18.00 | | | | | | | | | | | | | | | | | | | | | | |
| Pigment dispersion 4 | | | | 24.00 | 21.00 | 24.00 | 25.00 | | | | | | | | | | | | | | | | | | |
| Pigment dispersion 5 | | | | | | 6.00 | 5.00 | 18.00 | | | | | | | | | | | | | | | | | |
| Pigment dispersion 6 | | | | | | | | | 18.00 | | | | | | | | | | | | | | | | |
| Pigment dispersion 7 | | | | | | | | | | 18.00 | | | | | | | | | | | | | | | |
| Pigment dispersion 8 | | | | | | | | | | | 18.00 | | | | | | | | | | | | | | 6.00 |
| Pigment dispersion 9 | | | | | | | | | | | | 18.00 | | | | | | | | | | | | | |
| Pigment dispersion 10 | 12.00 | 12.00 | | | | | | 12.00 | 12.00 | | | 12.00 | 12.00 | 12.00 | | | | | | | | | | | 24.00 |
| Pigment dispersion 11 | | | 12.00 | | | | | | | | | | | | | | | | | | | | | | |
| Pigment dispersion 12 | | | | | | | | | | | | | | | 12.00 | 12.00 | | | | | | | | | |
| Pigment dispersion 13 | | | | | | | | | | | | | | | | | 12.00 12.00 | 12.00 | 12.00 | 12.00 | 12.00 | 12.00 | 12.00 | |
| Pigment dispersion 14 | | | | | | | | | | | | | | 18.00 | | | | | | | | | | | |
| Pigment dispersion 15 | | | | | | | | | | | | | 18.00 | | | 18.00 | | | | | | | | | |
| Pigment dispersion 16 | | | | | | | | | | | | | | | | | | | | | | 18.00 | | | |
| Pigment dispersion 17 | | | | | | | | | | | | | | | | | | | | | | | | | |
| Glycerin | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| 2-Pyrrolidone | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 | 5.00 |
| Trimethylolpropane | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 | 9.00 |
| Surfynol 465 | 0.15 | 0.15 | 0.15 | 0.15 | 0.15 | 0.15 | 0.15 | | 0.15 | 0.15 | 0.15 | 0.15 | 0.15 | 0.15 | 0.15 | 0.20 | 0.15 | 0.15 | 0.15 | 0.15 | 0.15 | 0.15 | 0.15 | 0.15 | 0.15 |
| NIKKOL BL-9EX | 0.20 | | 0.20 | 0.20 | 0.20 | 0.20 | 0.20 | 0.20 | 0.20 | 0.20 | 0.20 | 0.20 | 0.20 | 0.20 | 0.20 | | 0.20 | 0.04 | 0.05 | 0.60 | 0.70 | 0.20 | 0.20 | 0.15 | 0.20 |
| Ammonium phthalate | | 0.24 | | | | | | 0.24 | | | | | | | | | | | | | | | | | |
| Potassium phthalate | | | | | | | | | | | | | | | | | | | | | | | 0.10 | | |
| Ion-exchanged water | 46.65 | 46.61 | 46.65 | 46.65 | 46.65 | 46.65 | 46.65 | 46.61 | 46.65 | 46.65 | 46.65 | 46.65 | 46.65 | 46.65 | 46.65 | 46.65 | 46.85 | 46.81 | 46.80 | 46.25 | 46.15 | 46.65 | 46.70 | 46.65 | 46.85 |
| Content A of first pigment [%] | 1.80 | 1.80 | 1.80 | 0.60 | 0.90 | 2.40 | 2.50 | 1.80 | 1.80 | 1.80 | 1.80 | 1.80 | 1.80 | 1.80 | 1.80 | 1.80 | 1.80 | 1.80 | 1.80 | 1.80 | 1.80 | 1.80 | 1.80 | 1.80 | 0.60 |
| Content B of second pigment [%] | 1.20 | 1.20 | 1.20 | 2.40 | 2.10 | 0.60 | 0.50 | 1.20 | 1.20 | 1.20 | 1.20 | 1.20 | 1.20 | 1.20 | 1.20 | 1.20 | 1.20 | 1.20 | 1.20 | 1.20 | 1.20 | 1.20 | 1.20 | 1.20 | 2.40 |
| Mass ratio A/B [times] | 1.5 | 1.5 | 1.5 | 0.3 | 0.4 | 4.0 | 5.0 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 0.3 |
| Concentration of anion of salt* valence number of anion [mol/L] | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | — | 0.004 | 0.005 | 0.06 | 0.07 | 0.02 | 0.02 | 0.02 | 0.3 |

| | Comparative Example | | | | | | | | | | | | | | | | | Reference Example | |
|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 1 | 2 |
| Pigment dispersion 1 | 30.00 | | | | | | | | | | | | | | | | | | |
| Pigment dispersion 2 | | 30.00 | | | | | | | | | | | | | | | | 30.00 | |
| Pigment dispersion 3 | | | 30.00 | | | | | | | | | | | | | | | | |
| Pigment dispersion 4 | | | | 30.00 | | | | | | | | | | | | | | | |
| Pigment dispersion 5 | | | | | 30.00 | | | | | | | | | | | | | | |
| Pigment dispersion 6 | | | | | | 30.00 | | | | | | | | | | | | | |
| Pigment dispersion 7 | | | | | | | 30.00 | | | | | | | | | | | | |
| Pigment dispersion 8 | | | | | | | | 30.00 | | | | | | | | | | | |
| Pigment dispersion 9 | | | | | | | | | 30.00 | | | | | | | | | | |
| Pigment dispersion 10 | | | | | | | | | | 18.00 | 18.00 | 18.00 | 18.00 | 18.00 | 18.00 | 18.00 | 18.00 | | 30.00 |

*valence number of anion [mol/L]

TABLE 1-continued

Composition and characteristics of ink

| | | | | | | | | | | |
|---|---|---|---|---|---|---|---|---|---|---|
| Pigment dispersion 11 | 30.00 | | | | | | | | | |
| Pigment dispersion 12 | | 30.00 | | | | | | | | |
| Pigment dispersion 13 | | | 12.00 | | | | | | | |
| Pigment dispersion 14 | | | | 12.00 | | | | | | |
| Pigment dispersion 15 | | | | | 12.00 | | | | | |
| Pigment dispersion 16 | | | | | | 12.00 | | | | |
| Pigment dispersion 17 | | | | | | | 12.00 | 12.00 | 12.00 | 12.00 |
| Glycerin | 9.00 | 9.00 | 9.00 | 9.00 | 9.00 | 9.00 | 9.00 | 9.00 | 9.00 | 9.00 |
| 2-Pyrrolidone | 5.00 | 5.00 | 5.00 | 5.00 | 5.00 | 5.00 | 5.00 | 5.00 | 5.00 | 5.00 |
| Trimethylolpropane | 9.00 | 9.00 | 9.00 | 9.00 | 9.00 | 9.00 | 9.00 | 9.00 | 9.00 | 9.00 |
| Surfynol 465 | 0.15 | 0.15 | 0.15 | 0.15 | 0.15 | 0.15 | 0.15 | 0.15 | 0.15 | — |
| NIKKOL BL-9EX | — | — | — | — | — | — | — | — | — | 0.15 |
| Ammonium phthalate | — | 0.20 | — | 0.80 | — | — | — | 0.20 | — | 0.20 |
| Potassium phthalate | — | — | — | — | — | — | — | — | — | — |
| Ion-exchanged water | 46.85 | 46.65 | 46.85 | 46.05 | 46.85 | 46.85 | 46.85 | 46.65 | 46.65 | 46.65 |
| Content A of first pigment [%] | 3.00 | 3.00 | 0.00 | 0.00 | 3.00 | 0.00 | 0.00 | 1.80 | 1.80 | 0.00 |
| Content B of second pigment [%] | 0.00 | 0.00 | 3.00 | 3.00 | 0.00 | 3.00 | 3.00 | 1.20 | 1.20 | 3.00 |
| Mass ration A/B [times] | — | — | — | — | — | — | — | 1.5 | 1.5 | 0.0 |
| Concentration of anion of salt* valence number of anion [mol/L] | 0.02 | 0.02 | — | 0.08 | — | — | — | 0.02 | 0.02 | 0.02 |

Evaluation

Optical Density

An ink cartridge filled with each ink prepared above was set to an ink jet recording apparatus (trade name "PIXUS MP480", manufactured by CANON KABUSHIKI KAISHA) loaded with a recording head that ejects an ink by means of thermal energy. In the ink jet recording apparatus, the conditions that the resolution is 600 dpi by 600 dpi and one ink droplet having a mass of 25 ng plus/minus 10% is applied to a unit region of 1/600 inch by 1/600 inch were defined as a recording duty of 100%. A solid image (2 cm by 2 cm/one line) was recorded at a recording duty of 100% on each of three types of recording media (plain paper). The recording media used were trade name "SW-101" (manufactured by CANON KABUSHIKI KAISHA), trade name "Xerox 4200 Premium Multipurpose White Paper" (manufactured by Xerox Corporation), and trade name "Bright White InkjetPaper" (manufactured by Hewlett-Packard Company). On the next day of the recording, the optical density of each solid image recorded on the recording media was measured with a reflection densitometer (trade name "Macbeth RD-918", manufactured by GretagMacbeth). The optical density was evaluated by the average, maximum and minimum values. The evaluation criteria are as follows:

AA: the average value was 1.5 or more, the maximum value was 1.6 or more, and the minimum value was 1.2 or more, A: the average value was 1.45 or more and less than 1.5, the maximum value was 1.6 or more, and the minimum value was 1.15 or more and less than 1.2, B: the average value was 1.45 or more and less than 1.5, the maximum value was 1.55 or more and less than 1.6, and the minimum value was 1.15 or more and less than 1.2, and C: the average value was less than 1.45, or the maximum value was less than 1.55, or the minimum value was less than 1.15.

The results are shown in Table 2. In the present invention, AA, A and B in the evaluation criteria are acceptable optical density levels; and C is an unacceptable optical density level.

White Blur Resistance

The white blur resistance of images was evaluated using each ink (black ink) prepared above and yellow and magenta inks of trade name "BCI-326" (manufactured by CANON KABUSHIKI KAISHA) as follows. The yellow and magenta inks of trade name "BCI-326" are color inks containing dyes as coloring materials. An ink cartridge filled with each ink was set to an ink jet recording apparatus (trade name "PIXUS MG8130", manufactured by CANON KABUSHIKI KAISHA) loaded with a recording head that ejects inks by means of thermal energy. In the ink jet recording apparatus, "recording duty of 100%" was defined as follows: In a black ink, the conditions that the resolution is 600 dpi by 600 dpi and one ink droplet having a mass of 30 ng plus/minus 10% is applied to a unit region of 1/600 inch by 1/600 inch were defined as "a recording duty of 100%". In color inks, the conditions that the resolution is 600 dpi by 600 dpi and two ink droplets each having a mass of 5.5 ng plus/minus 10% are applied to a unit region of 1/600 inch by 1/600 inch were defined as "a recording duty of 100%". An image including a black solid image (2 cm in length and 0.5 mm in width) and a red (secondary color) solid image (2 cm in length and 2 mm in width) so as to be contiguous to each other was recorded on each of three types of recording media (plain paper). The recording duty of the black image was 100%. In the red image, the recording duty of the yellow ink was 87%, the recording duty of the magenta ink was 88%, and the recording duty was 175% in total. The recording media used were trade names "GF-500" and "SW-101" (manufactured by CANON KABUSHIKI KAISHA) and trade name "Bright White InkjetPaper" (manufactured by Hewlett-Packard Company). The contiguous portions of the resulting images were visually investigated to evaluate the white blur resistance. The evaluation criteria are as follows:

A: no white blur occurred in all of the three recording media,

B: unremarkable white blur occurred in at least one recording medium,

C: remarkable white blur occurred in one recording medium, and

D: remarkable white blur occurred in at least two recording media.

The results are shown in Table 2. In the present invention, A and B in the evaluation criteria are acceptable levels; and C and D are unacceptable levels.

Bleeding Resistance

The bleeding resistance of images was evaluated using each ink (black ink) prepared above and yellow ink of trade name "BCI-326" (manufactured by CANON KABUSHIKI KAISHA) as follows. The yellow ink of trade name "BCI-326" is a color ink containing a dye as a coloring material. An ink cartridge filled with each ink was set to an ink jet recording apparatus (trade name "PIXUS MG8130", manufactured by CANON KABUSHIKI KAISHA) loaded with a recording head that ejects inks by means of thermal energy. The definition of "a recording duty of 100%" of each ink is as in above. An image including a black solid image (2 cm in length and 0.5 mm in width) with a recording duty of 100% and two yellow solid images (each 2 cm in length and 2 mm in width) each with a recording duty of 65% on both sides of the black solid image so as to be contiguous to the black solid image was recorded on a recording medium (trade name "GF-500", manufactured by CANON KABUSHIKI KAISHA). The raggedness value at the border region (edge) between the black solid image and the yellow solid image was measured to evaluate the bleeding resistance. The raggedness values were measured with a personal image quality evaluation system (trade name "Personal IAS", manufactured by Quality Engineering Associates). The evaluation criteria are as follows:

A: the raggedness value was 12 micrometers or less,

B: the raggedness value was more than 12 micrometers and 17 micrometers or less, and C: the raggedness value was more than 17 micrometers.

The results are shown in Table 2. In the present invention, A and B in the evaluation criteria are acceptable levels; and C is an unacceptable level. A smaller raggedness value indicates a clear edge and higher bleeding resistance.

Sticking Resistance

An ink cartridge filled with each ink prepared above was set to an ink jet recording apparatus (trade name "PIXUS MG8130", manufactured by CANON KABUSHIKI KAISHA) loaded with a recording head that ejects an ink by means of thermal energy. The nozzle check pattern of trade name "MG8130" was recorded on a recording medium (trade name "GF-500", manufactured by CANON KABUSHIKI KAISHA). Subsequently, the head cartridge (recording head unit loaded with the ink cartridge) was detached from the recording apparatus, and the ink cartridge in the state being mounted on the recording head unit was left under an atmosphere of a temperature of 30 degrees Celsius and a relative humidity of 10% for 7 days. This head cartridge was set to the recording apparatus, and the nozzle check pattern of trade name "MG8130" was recorded again. If the nozzle check pattern was not normally recorded by clogging, cleaning by the printer driver was performed, and the nozzle check pattern was recorded again. If clogging occurred on this occasion again, powerful cleaning by the printer driver was performed, and the nozzle check pattern was recorded again. If clogging still occurred, powerful cleaning and recording of the nozzle check pattern were repeated. The sticking resistance was evaluated by the number of times of powerful cleaning required for normally recording of the nozzle check pattern. The evaluation criteria are as follows:

A: the nozzle check pattern was normally recorded by performing the powerful cleaning once or twice, B: the nozzle check pattern was normally recorded by performing the powerful cleaning three or four times, and C: five or more times of powerful cleaning were necessary until the nozzle check pattern was normally recorded.

The results are shown in Table 2. In the present invention, A and B in the evaluation criteria are acceptable levels; and C is an unacceptable level.

Storage Stability

Each ink prepared above was put in an airtight container and was stored at 80 degrees Celsius for one week. The ink was filtered again through the same polypropylene filter as that used in preparation of the ink under the same conditions. The filterability of the ink before and after the storage, i.e., the filterability of the ink before the storage and the filterability of the ink after the storage under the above-mentioned conditions were compared to evaluate the storage stability. The evaluation criteria are as follows:

A: the filterability was substantially the same between before and after the storage, B: the filterability after the storage decreased compared to that before the storage, but filtration was possible in both inks before and after the storage without any problem, and C: the filterability after the storage decreased compared to that before the storage, and clogging in the filter occurred during filtration of the ink after the storage.

The results are shown in Table 2. In the present invention, A and B in the evaluation criteria are acceptable levels; and C is an unacceptable level. If there is no problem with the filterability of an ink after the storage, it indicates that the storage stability of the ink did not decrease.

TABLE 2

| | | Evaluation results | | | | |
|---|---|---|---|---|---|---|
| | | Image characteristics | | | Reliability of ink | |
| | | Optical density | Bleeding resistance | White blur resistance | Sticking resistance | Storage stability |
| Example | 1 | AA | A | A | A | A |
| | 2 | AA | A | A | A | A |
| | 3 | AA | A | A | A | A |
| | 4 | B | A | A | A | A |
| | 5 | A | A | A | A | A |
| | 6 | AA | A | B | A | A |
| | 7 | AA | B | B | A | A |
| | 8 | A | A | A | A | A |
| | 9 | A | A | A | A | A |
| | 10 | AA | A | A | A | A |
| | 11 | A | A | A | A | B |
| | 12 | AA | A | A | A | B |
| | 13 | B | A | A | B | A |
| | 14 | B | B | A | B | A |
| | 15 | A | A | B | A | A |
| | 16 | B | A | B | B | A |
| | 17 | B | A | B | A | A |
| | 18 | B | A | A | A | A |
| | 19 | A | A | A | A | A |
| | 20 | AA | A | A | B | A |
| | 21 | AA | A | A | B | B |
| | 22 | AA | A | A | A | B |
| | 23 | AA | B | A | A | A |
| | 24 | AA | B | A | A | A |
| | 25 | B | B | B | B | A |
| Comparative Example | 1 | C | B | D | A | A |
| | 2 | C | B | D | A | A |
| | 3 | C | B | D | A | A |
| | 4 | A | B | C | A | A |
| | 5 | C | A | C | A | A |
| | 6 | C | A | A | A | A |
| | 7 | C | A | A | A | A |
| | 8 | C | B | B | B | B |
| | 9 | B | A | A | C | C |
| | 10 | C | B | C | A | A |
| | 11 | C | B | C | A | A |
| | 12 | C | A | A | A | A |
| | 13 | C | A | A | A | A |
| | 14 | C | B | A | A | B |
| | 15 | B | B | C | B | A |
| | 16 | C | B | C | B | A |
| | 17 | C | C | C | C | B |
| Reference Example | 1 | AA | C | B | A | A |
| | 2 | C | A | A | A | A |

Inks prepared using salts specified in the present invention that have not been described in the examples above were also evaluated as in Example 1. Specifically, the same evaluations as in above were performed under the same conditions except that salts different from those used in Example 1 were used in the same molar amount as that in Example 1 by adjusting the total amount to 100.00% with water. The results demonstrate that substantially the same results as those in Example 1 were obtained in every salts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-107452, filed May 9, 2012, which is hereby incorporated by reference herein in its entirety.

The invention claimed is:

1. An ink for ink jet, comprising a first pigment and a second pigment, wherein
   the first pigment is a self-dispersible pigment to a surface of a particle of which a first functional group containing a phosphonic acid group is bonded; the second pigment is a self-dispersible pigment to a surface of a particle of which a second functional group not containing a phosphonic acid group but containing an anionic group other than the phosphonic acid group, and further containing another atomic group is bonded; and
   the introduced amount of the functional group of the second pigment is 0.25 mmol/g or more,
   wherein the introduced amount of the functional group of the first pigment is 0.10 mmol/g or more to 0.33 mmol/g or less.

2. The ink according to claim 1, wherein the mass ratio of the content (% by mass) of the first pigment based on the total mass of the ink to the content (% by mass) of the second pigment based on the total mass of the ink is 0.4 times or more to 4.0 times or less.

3. The ink according to claim 1, wherein the first functional group contains two phosphonic acid groups.

4. The ink according to claim 1, wherein the second functional group is represented by —$R_1$—$(COOM_1)_n$ (wherein, $R_1$ represents an alkylene group or an arylene group; $M_1$ represents a hydrogen atom, an alkali metal, ammonium, or an organic ammonium; and n represents an integer of 1 or more).

5. The ink according to claim 1, wherein the introduced amount of the functional group of the first pigment is equal to or less than the introduced amount of the functional group of the second pigment.

6. The ink according to claim 1, the ink further comprising a salt constituted by combining a cation and an anion, wherein
the cation is at least one selected from the group consisting of alkali metal ion, ammonium ion and organic ammonium ion;
the anion is at least one selected from the group consisting of $Cl^-$, $Br^-$, $I^-$, $ClO^-$, $ClO_2^-$, $ClO_3^-$, $ClO_4^-$, $NO_2^-$, $NO_3^-$, $SO_4^{2-}$, $CO_3^{2-}$, $HCO_3^-$, $HCOO^-$, $(COO^-)_2$, $COOH(COO^-)$, $CH_3COO^-$, $C_2H_4(COO^-)_2$, $C_6H_5COO^-$, $C_6H_4(COO^-)_2$, $PO_4^{3-}$, $HPO_4^{2-}$ and $H_2PO_4^-$; and
the value obtained by multiplying the concentration of the anion of the salt in the ink by the valence number of the anion is 0.005 mol/L or more to 0.06 mol/L or less.

7. The ink according to claim 1, wherein the anionic group of the second functional group is at least one of a carboxylic acid group and a sulfonic acid group.

8. The ink according to claim 1, wherein the introduced amount of the functional group of the second pigment is 0.40 mmol/g or more.

9. The ink according to claim 1, wherein the introduced amount of the functional group of the second pigment is 1.00 mmol/g or less.

10. An ink cartridge comprising an ink and an ink storage portion for storing the ink, wherein
the ink comprises the ink according to claim 1.

11. An ink jet recording method comprising the step of recording an image on a recording medium by ejecting an ink from a recording head of an ink jet system, wherein
comprises the ink according to claim 1.

* * * * *